(12) United States Patent
Zhang et al.

(10) Patent No.: US 11,172,140 B2
(45) Date of Patent: Nov. 9, 2021

(54) IMAGE CAPTURE DEVICE INCLUDES WHITE LIGHT LAMP AND INFRARED LAMP FOR CAPTURING BETTER QUALITY IMAGES WHEN THE BRIGHTNESS OF THE ENVIRONMENT IS MODERATE

(71) Applicant: Hangzhou Hikvision Digital Technology Co., Ltd., Hangzhou (CN)

(72) Inventors: Guoping Zhang, Hangzhou (CN); Weimin Ma, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/102,613

(22) Filed: Nov. 24, 2020

(65) Prior Publication Data

US 2021/0105394 A1 Apr. 8, 2021

Related U.S. Application Data

(63) Continuation of application No. PCT/CN2018/123359, filed on Dec. 25, 2018.

(30) Foreign Application Priority Data

May 31, 2018 (CN) .......................... 201810550966.0

(51) Int. Cl.
*H04N 5/235* (2006.01)
*H04N 5/225* (2006.01)

(52) U.S. Cl.
CPC ......... *H04N 5/2354* (2013.01); *H04N 5/2256* (2013.01); *H04N 5/2351* (2013.01)

(58) Field of Classification Search
CPC .. H04N 5/2354; H04N 5/2256; H04N 5/2351; H04N 5/2254; H04N 5/235; H04N 5/332; H04N 5/23296; H04N 5/243
See application file for complete search history.

(56) References Cited

U.S. PATENT DOCUMENTS 7,724,280 B2 * 5/2010 Gin .................. G08B 13/19636
   348/159
7,889,987 B2 * 2/2011 Nitanda ................. H04N 5/225
   396/241

(Continued)

FOREIGN PATENT DOCUMENTS

CN 102148929 8/2011
CN 102821250 12/2012

(Continued)

OTHER PUBLICATIONS

International Search Report and Written Opinion issued in Corresponding PCT Application No. PCT/CN2018/123359, dated Mar. 14, 2019 (English Translation provided).

(Continued)

*Primary Examiner* — Luong T Nguyen
(74) *Attorney, Agent, or Firm* — Norton Rose Fulbright US LLP

(57) ABSTRACT

An image capture device, a control method and a machine readable storage medium are disclosed. The image capture device includes: a processor, an infrared lamp, and a white light lamp. The processor in the image capture device is used to control the infrared lamp and white light lamp. The processor obtains current acquisition parameters of the image capture device, compares the magnification in the current acquisition parameters with a preset first magnification threshold and a preset second magnification threshold to obtain a comparison result, and controls switching states of the infrared lamp and the white light lamp according to the comparison result, the brightness of the environment and the gain, wherein, the first magnification threshold is less than the second magnification threshold.

11 Claims, 2 Drawing Sheets

(56) References Cited

U.S. PATENT DOCUMENTS

| | | | |
|---|---|---|---|
| 9,310,603 B2* | 4/2016 | Fan | G02B 26/005 |
| 10,339,638 B2* | 7/2019 | Hayashi | G02B 26/007 |
| 2003/0093805 A1 | 5/2003 | Gin | |
| 2006/0109672 A1 | 5/2006 | Sasaki et al. | |
| 2018/0234603 A1* | 8/2018 | Moore | A61B 1/06 |

FOREIGN PATENT DOCUMENTS

| | | |
|---|---|---|
| CN | 104284068 | 1/2015 |
| CN | 104301623 | 1/2015 |
| CN | 105491285 | 4/2016 |
| CN | 105516593 | 4/2016 |
| CN | 105611127 | 5/2016 |
| CN | 106375645 | 2/2017 |
| CN | 107635099 | 1/2018 |
| EP | 3358823 | 8/2018 |
| WO | WO 2010/135575 | 11/2010 |
| WO | WO 2017/092445 | 6/2017 |

OTHER PUBLICATIONS

Extended European Search Report issued in Corresponding European Application No. 18920518.0, dated Jun. 28, 2021.

* cited by examiner

IMAGE CAPTURE DEVICE INCLUDES WHITE LIGHT LAMP AND INFRARED LAMP FOR CAPTURING BETTER QUALITY IMAGES WHEN THE BRIGHTNESS OF THE ENVIRONMENT IS MODERATE

CROSS REFERENCE TO RELATED APPLICATIONS

The present application is a continuation application of International Application No. PCT/CN2018/123359, filed Dec. 25, 2018, which claims the benefit of priority to Chinese patent application No. 201810550966.0 filed with the China National Intellectual Property Administration on May 31, 2018 and entitled "Image capture device, control method and machine readable storage medium", each of which are incorporated herein by reference in their entirety.

TECHNICAL FIELD

The present application relates to the field of computer technology, and in particular to an image capture device, a control method, and a machine readable storage medium.

BACKGROUND

With the continuous development of image acquisition technology, the image capture device has been more and more widely used, for example, in security monitoring, intelligent transportation and other fields. The image capture device can acquire images with better quality only when the brightness of the environment is moderate.

However, in some cases, such as rainy weather, night and so on, the brightness of the environment may be relatively dark, resulting in poor image quality acquired by the image capture device. Therefore, how to ensure that the brightness of the environment of the image capture device is moderate to improve the quality of the image acquired by the image capture device is an urgent problem to be solved.

SUMMARY

The embodiments of the present application are used to provide an image capture device, a control method, and a machine readable storage medium, so as to ensure that the brightness of the environment in which the image capture device is located is moderate, thereby improving the quality of the image acquired by the image capture device. Specifically, the technical solutions are as follows.

In a first aspect, an embodiment of the present application provides an image capture device that controls an infrared lamp and a white light lamp included therein, and the image capture device includes: a processor, a memory, an infrared lamp, and a white light lamp;

the memory stores machine-executable instructions, when the instructions are loaded and executed by the processor, the following steps are implemented:

obtaining current acquisition parameters of the image capture device; wherein, the current acquisition parameters comprise: a magnification, a brightness of the environment, and a gain;

comparing the magnification with a preset first magnification threshold and a preset second magnification threshold to obtain a comparison result; wherein, the first magnification threshold is less than the second magnification threshold; and controlling the infrared lamp and the white light lamp according to the comparison result, the brightness of the environment and the gain.

In a second aspect, an embodiment of the present application provides a method for controlling an infrared lamp and a white light lamp by an image capture device. The image capture device includes an infrared lamp and a white light lamp. The method includes:

obtaining current acquisition parameters of the image capture device; wherein, the current acquisition parameters include: magnification, brightness of the environment, and gain;

comparing the magnification with a preset first magnification threshold and a preset second magnification threshold to obtain a comparison result; wherein, the first magnification threshold is less than the second magnification threshold; and controlling switching states of the infrared lamp and the white light lamp according to the comparison result, the brightness of the environment and the gain.

In a third aspect, an embodiment of the present application provides a machine readable storage medium in which machine executable instructions are stored. When the instructions are loaded and executed by a processor included in an image capture device, the method steps described in the second aspect above are implemented.

In a fourth aspect, an embodiment of the present application also provides a computer program product including instructions that, when running on an image capture device, cause the image capture device to perform the method steps described in the second aspect above.

The embodiments of the present application provides an image capture device, a control method and a machine readable storage medium, wherein the image capture device includes: a processor, an infrared lamp, and a white light lamp. The processor in the image capture device is used to control the infrared lamp and white light lamp. Specifically, the processor obtains current acquisition parameters of the image capture device, compares the magnification in the current acquisition parameters with a preset first magnification threshold and a preset second magnification threshold to obtain a comparison result, and controls switching states of the infrared lamp and the white light lamp according to the comparison result, the brightness of the environment and the gain, wherein, the first magnification threshold is less than the second magnification threshold.

In the embodiment of the present application, the image capture device includes the white light lamp and the infrared lamp, so that the white light lamp and the infrared lamp can provide a light source to ensure that the brightness of the environment in which the image capture device is located is moderate, thereby improving the quality of the image acquired by the image capture device. In addition, it can be understood that the white light lamp is suitable for the case where the magnification of the image capture device is small, and the infrared lamp is suitable for the case where the magnification of the image capture device is big. Therefore, the image capture device provided by the embodiments of the present application can ensure that images with better quality can be acquired at any magnification.

It should be understood that any product or method for implementing the embodiments of the present disclosure does not necessarily require all of the advantages described above.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

The technical solution of the application will be described in detail with reference to the drawings of embodiments of the present application. Obviously, the embodiments described are only some but not all of the embodiments of the present application. All other embodiments obtained by those of ordinary skills in the art based on the embodiments herein without any creative efforts are within the scope of the present application.

Figure 1:
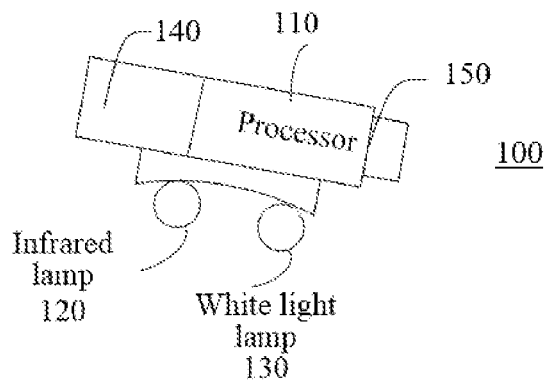
FIG. 1 is a schematic structural diagram of an image capture device including an infrared lamp and a white light lamp provided by an embodiment of the present application.

An embodiment of the present application provides an image capture device that controls an infrared lamp and a white light lamp included therein, as shown in FIG. 1, the image capture device 100 includes: a processor 110, a memory 140, an infrared lamp 120, and a white light lamp 130.

The memory 120 stores machine executable instructions. When the instructions are loaded and executed by the processor 110, the following steps are implemented:

a first step, obtaining current acquisition parameters of the image capture device; wherein, the current acquisition parameters include: magnification, brightness of the environment, and gain.

a second step, comparing the magnification with a preset first magnification threshold and a preset second magnification threshold to obtain a comparison result; wherein, the first magnification threshold is less than the second magnification threshold.

a third step, controlling switching states of the infrared lamp 120 and the white light lamp 130 according to the comparison result, the brightness of the environment and the gain.

The image capture device can acquires images with better quality only when the brightness of the environment is moderate. Otherwise, when the brightness of the environment is too bright, an overexposed image may be acquired; when the brightness of the environment is too dark, an excessively dark image may be acquired, which will affect the quality of the image.

The white light lamp, as a new type of energy-saving and environment-protecting lighting fixture, belongs to cold light source and can provide visible light. However, when a white light lamp is used in the image capture device, in the case of a big magnification, there may be insufficient supplementary light, which affects the imaging quality.

The infrared lamp is the abbreviation of night vision monitoring infrared lamp, and it is a supplementary light instrument for acquiring images at night in conjunction with an image capture device. The light emitted by the infrared lamp has two wavelengths of 850 nm and 940 nm, which are both invisible light and have the characteristics of concealment and energy-saving. Moreover, the supplementary light intensity of infrared lamp is much greater than that of white light lamp.

In the embodiment of the present application, in order to ensure that the image capture device can acquire images with better quality at any magnification, an infrared lamp 120 and a white light lamp 130 may be provided in the image capture device to supplement light through the infrared lamp 120 and the white light lamp 130, so as to ensure that the brightness of the environment in which the image capture device is located is moderate.

Wherein, the infrared lamp 120 may include an LED (Light Emitting Diode), a laser infrared lamp, etc., and the white light lamp 130 may be an LED white light lamp, etc., which is not limited in the embodiment of the present application.

The installation position of the infrared lamp 120 and the white light lamp 130 may be any position in the image capture device, as long as the irradiation range of the infrared lamp 120 and the white light lamp 130 can cover the acquisition area of the image capture device, the installation position of the infrared lamp 120 and the white light lamp 130 are not specifically limited by the embodiment of the present application.

The processor 110 may be a general-purpose processor, including a central processing unit (CPU), a network processor (NP), etc.; the processor may also be a digital signal processor (DSP), an application specific integrated circuit (ASIC), a field-programmable gate array (FPGA) or other programmable logic device, a discrete gate or transistor logic device, a discrete hardware component, etc., which are not limited by the embodiment of the present application.

The image capture device may use different acquisition parameters during image acquisition, such as magnification, brightness of the environment, and gain, etc.

The magnification is the ratio of the imaging size of the object captured by the image capture device on a focal plane through a lens to the actual size of the object.

The brightness of the environment may be the brightness of the environment fed back by a photosensitive component 150 of the image capture device, which can intuitively reflect the brightness of the current environment.

The gain is the signal amplification factor. In an image capture device, the lower the current brightness of the environment, the greater the gain adopted; the higher the current brightness of the environment, the smaller the gain adopted.

In the embodiment of the present application, the processor 110 in the image capture device may acquire current acquisition parameters; wherein the current acquisition parameters may include: magnification, brightness of the environment, and gain; so as to control switching states of the infrared lamp 120 and the white light lamp 130 according to the current acquisition parameters.

In one implementation, a first magnification threshold and a second magnification threshold may be preset, and the first magnification threshold is less than the second magnification threshold. Furthermore, when performing image acquisition, when the processor 110 executes an instruction, it can first compare the magnification with the first magnification threshold and the second magnification threshold, that is, roughly determine that the lighting device to be turned on is the infrared lamp 120 and/or the white light lamp 130; further, according to the comparison result, as well as the ambient brightness and gain, the switching state of the infrared lamp 120 and the white light lamp 130 can be accurately controlled.

Wherein, the first magnification threshold and the second magnification threshold may be set according to different infrared lamp modules, white light lamp modules, and photosensitive components of image capture device, in order to achieve the best image effect, the embodiment of the present application does not limit specific values of the first magnification threshold and the second magnification threshold.

In the embodiment of the present application, the image capture device includes the white light lamp and the infrared lamp, so that the white light lamp and the infrared lamp can provide a light source to ensure that the brightness of the environment in which the image capture device is located is moderate, thereby improving the quality of the image acquired by the image capture device. In addition, it can be understood that the white light lamp is suitable for the case where the magnification of the image capture device is small, and the infrared lamp is suitable for the case where the magnification of the image capture device is big. Therefore, the image capture device provided by the embodiments of the present application can ensure that images with better quality can be acquired at any magnification.

In one optional embodiment, when the magnification is less than the first magnification threshold, it indicates that the supplementary light effect of the white light lamp 130 is sufficient, and it is not suitable to turn on the infrared lamp 120. At this time, the processor 110 may control the switching state of the infrared lamp 120 to be off, and control the switching state of the white light lamp 130 according to the brightness of the environment and the gain.

When the magnification is greater than the second magnification threshold, it indicates that it is not suitable to turn on the white light lamp 130, and the infrared lamp 120 needs to be turned on to obtain a stronger light source. At this time, the processor 110 may control the switching state of the white light lamp 130 to be off, and control the switching state of the infrared lamp 120 according to the brightness of the environment and the gain.

When the processor 110 controls the switching state of the white light lamp 130 according to the brightness of the environment and the gain, specifically, it can determine whether the brightness of the environment is less than a preset first brightness threshold and whether the gain is greater than a preset first gain threshold, and if the brightness of the environment is less than the preset first brightness threshold and the gain is greater than the preset first gain threshold, the switching state of the white light lamp 130 is controlled to be on; otherwise, the switching state of the white light lamp 130 is controlled to be off.

Similarly, when the processor 110 controls the switching state of the infrared lamp 120 according to the brightness of the environment and the gain, specifically, it can determine whether the brightness of the environment is less than a preset second brightness threshold and whether the gain is greater than a preset second gain threshold, and if the brightness of the environment is less than a preset second brightness threshold and the gain is greater than a preset second gain threshold, the switching state of the infrared lamp 120 is controlled to be on; otherwise, the switching state of the infrared lamp 120 is controlled to be off.

Wherein, the first brightness threshold and the second brightness threshold may be the same or different, and there is no limit to which one of the first brightness threshold and the second brightness threshold is bigger; and the first gain threshold and the second gain threshold may be the same or different, and there is no limit to which one of the first gain threshold and the second gain threshold is bigger, which is not limited in the embodiment of the present application. In addition, the first brightness threshold, the second brightness threshold, the first gain threshold, and the second gain threshold may be set according to different infrared lamp modules, white light lamp modules, and photosensitive components of the image capture device, in order to achieve the best image effect, the embodiment of the present application does not limit specific values of the above thresholds.

In the embodiment, the switching states of the infrared lamp 120 and the white light lamp 130 may be controlled according to the magnification, brightness of the environment, and gain, so that the brightness of the environment in which the image capture device is located can be accurately controlled, and the quality of the image acquired by the image capture device can be further improved.

In the process of using the infrared lamp, when the infrared lamp is turned on, a flashlight effect will appear at a low magnification, that is, the center of the image will be overexposed and the surrounding will be dark.

In one implementation of the embodiment of the present application, when the magnification is greater than the first magnification threshold and less than the second magnification threshold, the processor 110 may control the switching states of both the infrared lamp 120 and the white light lamp 130 to be on. In this way, the infrared lamp 120 and the white light lamp 130 are turned on at the same time at a middle magnification, which can effectively solve the flashlight effect of the infrared lamp and improve the quality of the image acquired by the image capture device.

A filter is an optical equipment used to select the desired radiative wavelength band. A black and white filter and a color filter are commonly used. The black and white filter, that is, the sensitive infrared filter, allows all visible light to pass through; the color filter, that is, the insensitive infrared filter, allows visible light other than infrared light to pass through.

In the process of using the infrared lamp, it usually needs to be used with a filter. Specifically, when the infrared lamp is turned on, a black and white filter is needed to ensure the supplementary light effect of the infrared lamp.

In one implementation of the embodiment of the present application, the image capture device may also include: a black and white filter and a color filter. Correspondingly, the processor 110 may switch the black and white filter and the color filter according to the current acquisition parameters.

In one optional embodiment, the processor 110 may set a third magnification threshold in advance when switching the filter, and the third magnification threshold is less than the first magnification threshold. When the processor 110 detects that the magnification is less than or equal to the third magnification threshold, the current filter is switched to a color filter; when the magnification is greater than the third magnification threshold, the current filter is switched to a black and white filter. In this way, it can be ensured that the infrared lamp 120 is switched to the black and white filter when the infrared lamp is turned on, thereby ensuring the supplementary light effect of the infrared lamp 120 and improving the quality of the image acquired by the image capture device.

In the application process of the image capture device, it may be set to cruise mode, that is, the image capture device automatically switches at multiple preset points. For example, an image capture device may be set to cruise mode to realize the monitoring of multiple preset points through one image capture device and improve the utilization rate of the image capture device.

When the image capture device is in cruise mode, the brightness of the environment and the required magnification between multiple corresponding preset points may vary significantly. This may cause frequent switching of the white light lamp 130, the infrared lamp 120, and the filter. However, as a hardware module inside the device, the filter has a limited maximum service life.

In one implementation of the embodiment of the present application, in order to reduce the number of times of switching the filter and increase the service life, after switching to a black and white filter at a big magnification, the filter may not be switched when the magnification is reduced.

Specifically, the processor 110 may determine whether the image capture device is currently in a cruise mode before acquiring the current acquisition parameters of the image capture device; compare the magnification with a preset first magnification threshold and a preset second magnification threshold to obtain a comparison result when it is determined that the image capture device is currently in a cruise mode; control the switching states of the infrared lamp 120 and the white light lamp 130, and determine whether to switch the black and white filter and the color filter according to the comparison result, and the brightness of the environment and the gain.

For example, when the magnification is less than the first magnification threshold, the switching state of the infrared lamp 120 is controlled to be off, whether the brightness of the environment is less than the preset first brightness threshold and whether the gain is greater than the preset first gain threshold is determined, if the brightness of the environment is less than the preset first brightness threshold and the gain is greater than the preset first gain threshold, the switching state of the white light lamp 130 is controlled to be on, and the current filter is kept as a black and white filter; otherwise, the switching state of the white light lamp 130 is controlled to be off, and the current filter is switched to a color filter.

When the magnification is greater than the second magnification threshold, the switching state of the white light lamp 130 is controlled to be off, whether the brightness of the environment is less than the preset second brightness threshold and whether the gain is greater than the preset second gain threshold is determined, if the brightness of the environment is less than the preset second brightness threshold and the gain is greater than the preset second gain threshold, the switching state of the infrared lamp 120 is controlled to be on, and the current filter is switched to a black and white filter; otherwise, the switching state of the infrared lamp 120 is controlled to be off, and the current filter is switched to a color filter.

That is to say, when switching from a high magnification to a low magnification, the filter is not switched, so as to avoid that the filter needs to be switched again when entering a high magnification environment again.

It can be understood that the infrared lamp 120 is turned off at a low magnification, and the filter is a color filter or a black and white filter, which does not significantly affect the image effect. Therefore, the solution provided by this embodiment can reduce the switching number of times of the filter and increase the service life of the device while ensuring the image quality.

In summary, the image capture device provided by the embodiments of the present application may have the following states:

| Supplementary light state | Filter state | Infrared lamp state | White light lamp state |
|---|---|---|---|
| 1. Daytime | Color | Off | Off |
| 2. Night | Black and white | On | Off |
| 3. White light lamp on | Color | Off | On |
| 4. White light lamp on + infrared light on | Black and white | On | On |
| 5. Night + infrared light off | Black and white | Off | On |

In a first state, in which the brightness of the environment during the daytime is high and the white light lamp 130 does not need to be turned on at a low magnification, the infrared lamp 120 and the white light lamp 130 then are both turned off, and the filter is a color filter;

in a second state, in which the brightness of the environment during the night is low and the infrared lamp 120 needs to be turned on at a high magnification, the infrared lamp 120 then is turned on, the white light lamp 130 is turned off, and the filter is a black and white filter;

in a third state, in which the brightness of the environment is high and the white light lamp 130 needs to be turned on and the infrared lamp 120 does not need to be turned on at a low magnification, the infrared lamp 120 then is turned off, the white light lamp 130 is turned on, and the filter is a color filter;

in a fourth state, in which the brightness of the environment is low and, at a middle magnification, the infrared lamp 120 needs to be turned on, and in order to eliminate the flashlight effect, the white light lamp 130 must also be turned on, the infrared lamp 120 then is turned on, and the white light lamp 130 is also turned on, the filter is a black and white filter;

in a fifth state, in which in a cruise mode, the brightness of the environment is high and, at a low magnification, the white light lamp 130 needs to be turned on, and the infrared lamp 120 does not need to be turned on, the infrared lamp 120 then is turned off, the white light lamp 130 is turned on, and in order to avoid frequent switching of the filter, the filter is a black and white filter.

The working process of the image capture device of the embodiment of the present application will be described in detail below in conjunction with a specific embodiment.

Figure 2:
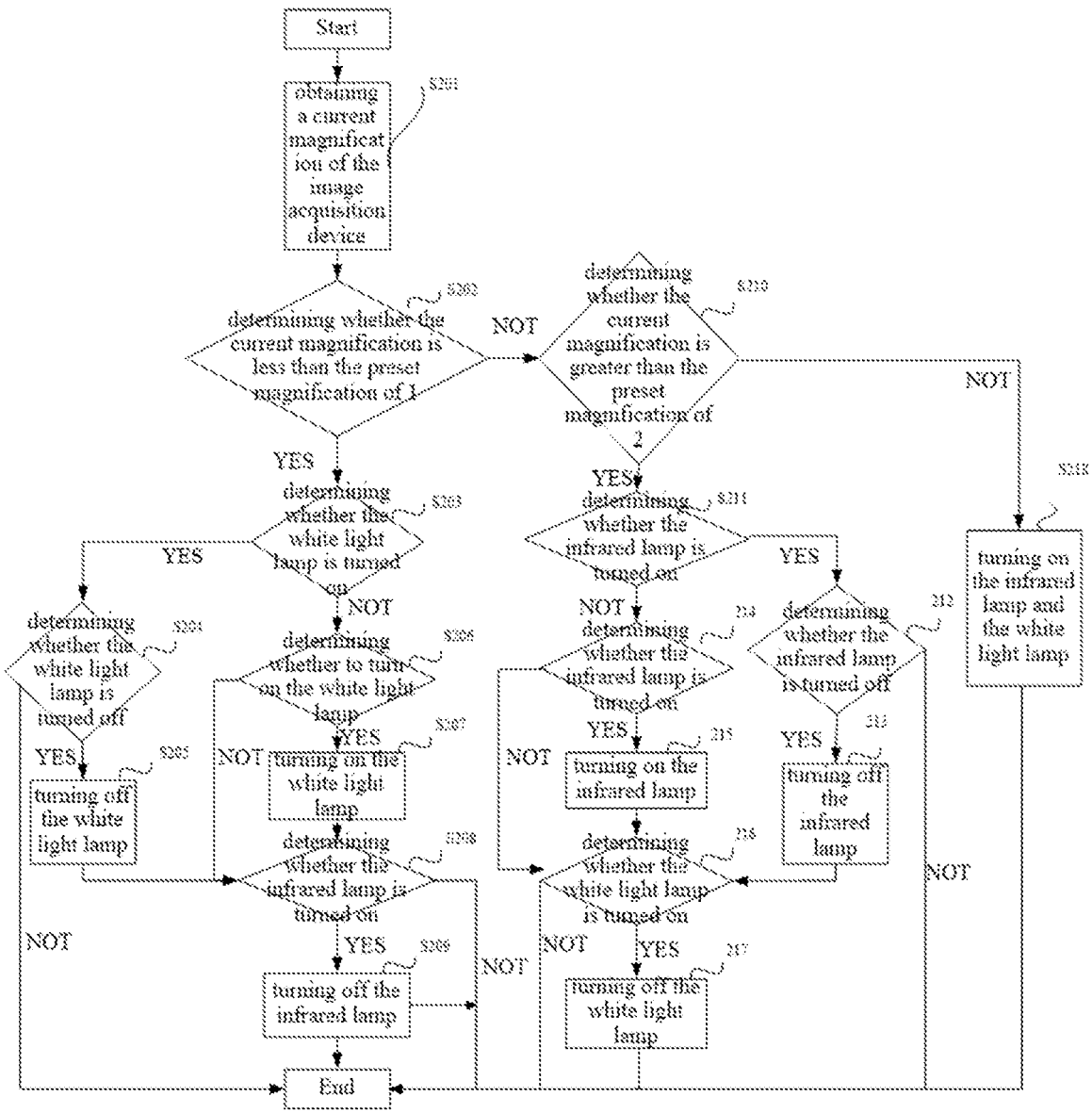
FIG. 2 is a schematic flowchart of the controlling of an infrared lamp and a white light lamp by an image capture device provided by an embodiment of the present application.

As shown in FIG. 2, it shows a schematic flow chart of controlling the infrared lamp and the white light lamp by the image capture device of the embodiment of the present application. The flow shown in FIG. 2 is applicable to the process of controlling the light source in cruise mode and non-cruise mode. The process includes the following steps:

S201, obtaining a current magnification of the image capture device; S202, determining whether the current magnification is less than the preset magnification 1; if the current magnification is less than the preset magnification 1, performing S203; otherwise, performing S210;

S203, determining whether the white light lamp is turned on; if the white light lamp is turned on, performing S204; otherwise, performing S206;

S204, determining whether the white light lamp is turned off; if the white light lamp is turned off, performing S205; otherwise, ending;

Specifically, it can be determined whether to turn off the white light lamp according to the current brightness of the environment and the gain.

S205, turning off the white light lamp; and continuing to perform S208; S206, determining whether to turn on the white light lamp; if the white light lamp is turned on, performing S207; otherwise, performing S208;

Specifically, it can be determined whether to turn on the white light lamp according to the current brightness of the environment and the gain.

S207, turning on the white light lamp; and continuing to perform S208; S208, determining whether the infrared lamp is turned on; if the infrared lamp is turned on, performing S209; otherwise, ending;

S209, turning off the infrared lamp;

In the case of low magnification, the supplementary light effect of the white light lamp is better, and it is not suitable to turn on the infrared lamp. Moreover, since there may be a case where the white light lamp and the infrared lamp are turned on at the same time, thus no matter the white light lamp is turned on or off, it is necessary to determine whether the infrared lamp is turned on, and turn off the infrared lamp in case it is turned on.

S210, determining whether the current magnification is greater than the preset magnification 2; if the current magnification is greater than the preset magnification 2, performing S211; otherwise, performing S218;

wherein, the preset magnification 2 is greater than the preset magnification 1. S211, determining whether the infrared lamp is turned on; if the infrared lamp is turned on, performing S212; otherwise, performing S214;

S212, determining whether the infrared lamp is turned off; if the infrared lamp is turned off, performing S213; otherwise, ending;

Specifically, it can be determined whether to turn off the infrared lamp according to the current brightness of the environment and the gain.

S213, turning off the infrared lamp; and continuing to perform S216;

S214, determining whether the infrared lamp is turned on; if the infrared lamp is turned on, performing S215; otherwise, performing S216;

Specifically, it can be determined whether to turn on the infrared lamp according to the current brightness of the environment and the gain.

S215, turning on the infrared lamp; and continuing to perform S216;

S216, determining whether the white light lamp is turned on; if the white light lamp is turned on, performing S217; otherwise, ending;

S217, turning off the white light lamp;

In the case of high magnification, the supplementary light effect of the infrared lamp is better, and it is not suitable to turn on the white light lamp. Moreover, since there may be a case where the white light lamp and the infrared lamp are turned on at the same time, thus no matter the infrared lamp is turned on or off, it is necessary to determine whether the white light lamp is turned on, and turn off the white light lamp in case it is turned on.

S218, turning on the infrared lamp and the white light lamp.

In the case of middle magnification, the infrared lamp and white light lamp are turned on at the same time, so as to reduce the noise, solve the flashlight effect of the infrared lamp, and improve the image quality.

Figure 3:
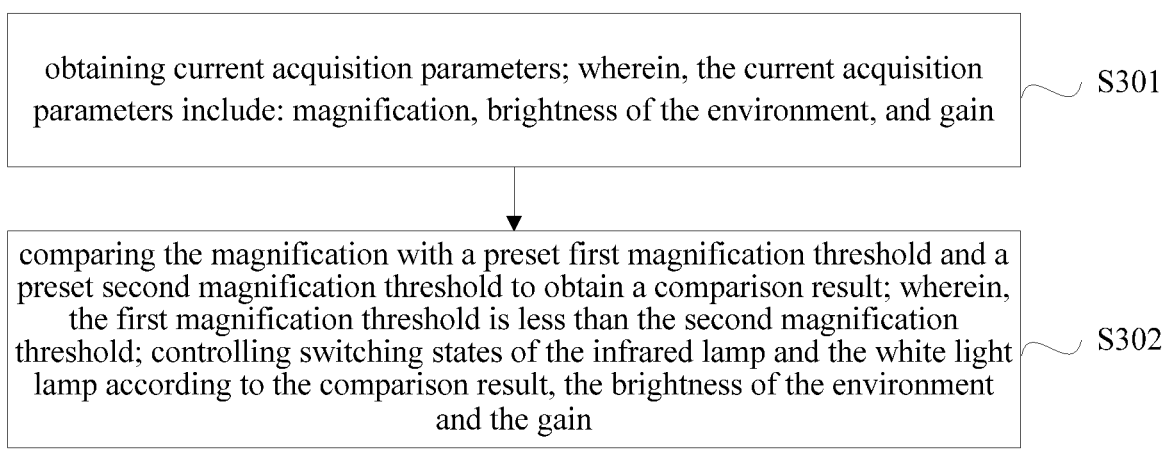
FIG. 3 is a schematic flowchart of the controlling of an infrared lamp and a white light lamp by an image capture device provided by another embodiment of the present application.

The embodiment of the present application also provides a method of controlling an infrared lamp and a white light lamp by an image capture device. As shown in FIG. 3, the method includes the following steps:

S301: obtaining current acquisition parameters; wherein, the current acquisition parameters include: magnification, brightness of the environment, and gain;

S302, comparing the magnification with a preset first magnification threshold and a preset second magnification threshold to obtain a comparison result; wherein, the first magnification threshold is less than the second magnification threshold; controlling switching states of the infrared lamp and the white light lamp according to the comparison result, the brightness of the environment and the gain.

In the embodiment of the present application, the image capture device includes the white light lamp and the infrared lamp, so that the white light lamp and the infrared lamp can provide a light source to ensure that the brightness of the environment in which the image capture device is located is moderate, thereby improving the quality of the image acquired by the image capture device. In addition, it can be understood that the white light lamp is suitable for the case where the magnification of the image capture device is small, and the infrared lamp is suitable for the case where the magnification of the image capture device is big. Therefore, the image capture device provided by the embodiments of the present application can ensure that images with better quality can be acquired at any magnification.

As one implementation of the embodiment of the present application, the step of controlling switching states of the infrared lamp and the white light lamp according to the comparison result, the brightness of the environment and the gain may include:

controlling the switching state of the infrared lamp to be off when the magnification is less than the first magnification threshold; and determining whether the brightness of the environment is less than the preset first brightness threshold and whether the gain is greater than the preset first gain threshold;

if the brightness of the environment is less than the preset first brightness threshold and the gain is greater than the preset first gain threshold, controlling the switching state of the white light lamp to be on;

otherwise, controlling the switching state of the white light lamp to be off.

As one implementation of the embodiment of the present application, the step of controlling switching states of the infrared lamp and the white light lamp according to the comparison result, the brightness of the environment and the gain may include:

controlling the switching state of the white light lamp to be off when the magnification is greater than the second magnification threshold; and determining whether the brightness of the environment is less than the preset second brightness threshold and whether the gain is greater than the preset second gain threshold;

if the brightness of the environment is less than the preset second brightness threshold and the gain is greater than the preset second gain threshold, controlling the switching state of the infrared lamp to be on;

otherwise, controlling the switching state of the infrared lamp to be off.

As one implementation of the embodiment of the present application, the step of controlling switching states of the infrared lamp and the white light lamp according to the comparison result, the brightness of the environment and the gain may include:

controlling the switching states of the infrared lamp and the white light lamp to be on when the magnification is greater than the first magnification threshold and less than the second magnification threshold.

As one implementation of the embodiment of the present application, the image capture device also includes: a black and white filter and a color filter. The method may also include:

switching the current filter to the color filter when the magnification is less than or equal to a preset third magnification threshold; and switching the current filter to the black and white filter when the magnification is greater than the third magnification threshold; wherein, the third magnification threshold is less than the first magnification threshold.

As one implementation of the embodiment of the present application, the image capture device also includes: a black and white filter and a color filter;

before the step of obtaining the current acquisition parameters of the image capture device, the method also includes:

determining whether the image capture device is currently in a cruise mode; the step of comparing the magnification with a preset first magnification threshold and a preset second magnification threshold to obtain a comparison result and controlling switching states of the infrared lamp and the white light lamp according to the comparison result, the brightness of the environment and the gain includes:

comparing the magnification with a preset first magnification threshold and a preset second magnification threshold to obtain a comparison result when it is determined that the image capture device is currently in a cruise mode; and controlling switching states of the infrared lamp and the white light lamp according to the comparison result, the brightness of the environment and the gain; and determining whether to switch the black and white filter and the color filter.

As one implementation of the embodiment of the present application, the step of controlling switching states of the infrared lamp and the white light lamp according to the comparison result, the brightness of the environment and the gain and determining whether to switch the black and white filter and the color filter may include:

controlling the switching state of the infrared lamp to be off when the magnification is less than the first magnification threshold; and determining whether the brightness of the environment is less than the preset first brightness threshold and whether the gain is greater than the preset first gain threshold;

if the brightness of the environment is less than the preset first brightness threshold and the gain is greater than the preset first gain threshold, controlling the switching state of the white light lamp to be on, keeping the current filter as the black and white filter;

otherwise, controlling the switching state of the white light lamp to be off, switching the current filter to the color filter.

As one implementation of the embodiment of the present application, the step of controlling switching states of the infrared lamp and the white light lamp according to the comparison result, the brightness of the environment and the gain and determining whether to switch the black and white filter and the color filter may include:

controlling the switching state of the white light lamp to be off when the magnification is greater than the second magnification threshold; and determining whether the brightness of the environment is less than the preset second brightness threshold and whether the gain is greater than the preset second gain threshold;

if the brightness of the environment is less than the preset second brightness threshold and the gain is greater than the preset second gain threshold, controlling the switching state of the infrared lamp to be on, switching the current filter to the black and white filter;

otherwise, controlling the switching state of the infrared lamp to be off, switching the current filter to the color filter.

The embodiment of the present application also provides a machine readable storage medium in which machine executable instructions are stored. when the instructions are loaded and executed by a processor included in an image capture device, the method steps described in the method embodiment are implemented.

In the embodiment of the present application, the image capture device includes the white light lamp and the infrared lamp, so that the white light lamp and the infrared lamp can provide a light source to ensure that the brightness of the environment in which the image capture device is located is moderate, thereby improving the quality of the image acquired by the image capture device. In addition, it can be understood that the white light lamp is suitable for the case where the magnification of the image capture device is small, and the infrared lamp is suitable for the case where the magnification of the image capture device is big. Therefore, the image capture device provided by the embodiments of the present application can ensure that images with better quality can be acquired at any magnification.

The embodiment of the present application also provides a computer program product including instructions that, when running on an image capture device, cause the image capture device to perform the method steps described in the embodiment of the above control method.

In the embodiment of the present application, the image capture device includes the white light lamp and the infrared lamp, so that the white light lamp and the infrared lamp can provide a light source to ensure that the brightness of the environment in which the image capture device is located is moderate, thereby improving the quality of the image acquired by the image capture device. In addition, it can be understood that the white light lamp is suitable for the case where the magnification of the image capture device is small, and the infrared lamp is suitable for the case where the magnification of the image capture device is big. Therefore, the image capture device provided by the embodiments of the present application can ensure that images with better quality can be acquired at any magnification.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. For embodiments of the method and the machine readable storage medium, since they are similar to the embodiments of the device, the description thereof is relatively simple; the relating parts could refer to the parts of the description of embodiments of the device.

The embodiments described above are merely preferred embodiments of the present application, and not intended to limit the scope of the present application. Any modifications, equivalents, improvements or the like within the spirit and principle of the application should be included in the scope of the application.

What is claimed is:

1. An image capture device, wherein the image capture device controls an infrared lamp and a white light lamp comprised therein, and the image capture device comprises: a processor, a memory, the infrared lamp, and the white light lamp;
the memory stores machine-executable instructions, when the machine-executable instructions are loaded and executed by the processor, the following steps are implemented:
obtaining current acquisition parameters of the image capture device; wherein, the current acquisition parameters comprise: a magnification, a brightness of an environment, and a gain;
comparing the magnification with a preset first magnification threshold and a preset second magnification threshold to obtain a comparison result; wherein, the preset first magnification threshold is less than the preset second magnification threshold; and
controlling switching states of the infrared lamp and the white light lamp according to the comparison result, the brightness of the environment and the gain.

2. The image capture device of claim 1, wherein the processor, when implementing the step of the controlling switching states of the infrared lamp and the white light lamp according to the comparison result, the brightness of the environment and the gain, implements specific steps as follows:
controlling a switching state of the infrared lamp to be off when the magnification is less than the preset first magnification threshold; and
determining whether the brightness of the environment is less than a preset first brightness threshold and whether the gain is greater than a preset first gain threshold;
if the brightness of the environment is less than the preset first brightness threshold and the gain is greater than the preset first gain threshold, controlling a switching state of the white light lamp to be on;
otherwise, controlling the switching state of the white light lamp to be off.

3. The image capture device of claim 1, wherein the processor, when implementing the step of the controlling switching states of the infrared lamp and the white light lamp according to the comparison result, the brightness of the environment and the gain, implements specific steps as follows:
controlling a switching state of the white light lamp to be off when the magnification is greater than the preset second magnification threshold; and
determining whether the brightness of the environment is less than a preset second brightness threshold and whether the gain is greater than a preset second gain threshold;
if the brightness of the environment is less than the preset second brightness threshold and the gain is greater than the preset second gain threshold, controlling a switching state of the infrared lamp to be on;
otherwise, controlling the switching state of the infrared lamp to be off.

4. The image capture device of claim 1, wherein the processor, when implementing the step of the controlling switching states of the infrared lamp and the white light lamp according to the comparison result, the brightness of the environment and the gain, implements specific steps as follows:
controlling the switching states of the infrared lamp and the white light lamp to be on when the magnification is greater than the preset first magnification threshold and less than the preset second magnification threshold.

5. The image capture device of claim 1, wherein the image capture device further comprises: a black and white filter and a color filter;
the processor, when loading and executing the machine-executable instructions, further implements steps as follows:
switching a current filter to the color filter when the magnification is less than or equal to a preset third magnification threshold; and
switching the current filter to the black and white filter when the magnification is greater than the preset third magnification threshold; wherein, the preset third magnification threshold is less than the preset first magnification threshold.

6. The image capture device of claim 1, wherein the image capture device further comprises: a black and white filter and a color filter;
the processor, when loading and executing the machine-executable instructions, further implements steps as follows:
determining whether the image capture device is currently in a cruise mode before obtaining the current acquisition parameters of the image capture device;
comparing the magnification with the preset first magnification threshold and the preset second magnification threshold to obtain the comparison result when it is determined that the image capture device is currently in a cruise mode; and
controlling switching states of the infrared lamp and the white light lamp according to the comparison result, the brightness of the environment and the gain; and determining whether to switch the black and white filter and the color filter.

7. The image capture device of claim 6, wherein the processor, when implementing the step of the controlling switching states of the infrared lamp and the white light lamp according to the comparison result, the brightness of the environment and the gain and determining whether to switch the black and white filter and the color filter, implements specific steps as follows:
controlling the switching state of the infrared lamp to be off when the magnification is less than the preset first magnification threshold; and determining whether the brightness of the environment is less than the preset first brightness threshold and whether the gain is greater than the preset first gain threshold;
if the brightness of the environment is less than the preset first brightness threshold and the gain is greater than the preset first gain threshold, controlling the switching state of the white light lamp to be on, keeping a current filter as the black and white filter;
otherwise, controlling the switching state of the white light lamp to be off, switching the current filter to the color filter.

8. The image capture device of claim 6, wherein the processor, when implementing the step of the controlling switching states of the infrared lamp and the white light lamp according to the comparison result, the brightness of the environment and the gain and determining whether to switch the black and white filter and the color filter, implements specific steps as follows:

controlling the switching state of the white light lamp to be off when the magnification is greater than the preset second magnification threshold; and determining whether the brightness of the environment is less than the preset second brightness threshold and whether the gain is greater than the preset second gain threshold;

if the brightness of the environment is less than the preset second brightness threshold and the gain is greater than the preset second gain threshold, controlling the switching state of the infrared lamp to be on, switching the current filter to the black and white filter;

otherwise, controlling the switching state of the infrared lamp to be off, switching the current filter to the color filter.

9. The image capture device of claim 1, wherein the image capture device further comprises: a photosensitive component;

the photosensitive component is configured to sense the brightness of the environment.

10. A method for controlling an infrared lamp and a white light lamp by an image capture device, wherein the image capture device comprises the infrared lamp and the white light lamp, the method comprises:

obtaining current acquisition parameters of the image capture device; wherein, the current acquisition parameters comprise: a magnification, a brightness of an environment, and a gain;

comparing the magnification with a preset first magnification threshold and a preset second magnification threshold to obtain a comparison result; wherein, the preset first magnification threshold is less than the preset second magnification threshold; and controlling switching states of the infrared lamp and the white light lamp according to the comparison result, the brightness of the environment and the gain.

11. A method for illuminating a scene monitored by an image capture device, wherein the image capture device has a first lamp emitting infrared light and a second lamp emitting visual light, said method comprising:

obtaining current capture parameters of the image capture device; wherein, the current capture parameters comprise: a magnification, a brightness of an environment, and a gain;

comparing the magnification with a preset first magnification threshold and a preset second magnification threshold, wherein, the preset first magnification threshold is less than the preset second magnification threshold;

when the obtained magnification is greater than the preset first magnification threshold and less than the preset second magnification threshold, controlling the first lamp to emit infrared light and the second lamp to emit visual light for illumination the scene.

* * * * *